(12) United States Patent
Gupta et al.

(10) Patent No.: US 12,401,584 B2
(45) Date of Patent: Aug. 26, 2025

(54) UNDERLAY PATH DISCOVERY FOR A WIDE AREA NETWORK

(71) Applicant: Cisco Technology, Inc., San Jose, CA (US)

(72) Inventors: Anubhav Gupta, Fremont, CA (US); Pritam Baruah, San Jose, CA (US); Laxmikantha Reddy Ponnuru, Santa Clara, CA (US); Sireesha Yeruva, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 606 days.

(21) Appl. No.: 17/846,647

(22) Filed: Jun. 22, 2022

(65) Prior Publication Data
US 2023/0261963 A1    Aug. 17, 2023

Related U.S. Application Data

(60) Provisional application No. 63/311,284, filed on Feb. 17, 2022.

(51) Int. Cl.
*H04L 43/12* (2022.01)
*H04L 45/00* (2022.01)
*H04L 45/02* (2022.01)

(52) U.S. Cl.
CPC ............ *H04L 45/02* (2013.01); *H04L 43/12* (2013.01); *H04L 45/20* (2013.01)

(58) Field of Classification Search
None
See application file for complete search history.

(56) References Cited

U.S. PATENT DOCUMENTS

| | | | | |
|---|---|---|---|---|
| 7,139,841 B1 * | 11/2006 | Somasundaram | ...... | H04L 61/25 709/236 |
| 7,697,524 B2 * | 4/2010 | Subramanian | .......... | H04L 45/16 370/432 |
| 8,355,316 B1 * | 1/2013 | Lushear | .............. | H04L 41/0677 370/242 |

(Continued)

OTHER PUBLICATIONS

Aref, Network Address Translation (NAT) Trick, The Cisco Learning Network, pp. 1-8. (Year: 2019).*

(Continued)

*Primary Examiner* — Nicholas Sloms
(74) *Attorney, Agent, or Firm* — Polsinelli P.C.

(57) ABSTRACT

The subject matter of this disclosure relates in general to the field of computer networking, and more particularly, to systems and methods for discovery of a tunnel for wide area network. Certain aspects provide a method for network path analysis. The method includes sending a first probe packet configured to identify a network tunnel, wherein the first probe packet includes an identifier of the first probe packet and a first time to live (TTL) value that corresponds to a first network hop; receiving a first response message from the first network hop in the network tunnel, wherein the first response message corresponds to the first probe packet and includes the identifier of the first probe packet; and analyzing the network tunnel based on the first response message including the identifier of the first probe packet.

20 Claims, 9 Drawing Sheets

(56) References Cited

U.S. PATENT DOCUMENTS

| | | | | |
|---|---|---|---|---|
| 8,670,326 | B1* | 3/2014 | Balasubramanian | H04L 45/22 709/227 |
| 9,497,107 | B1* | 11/2016 | Akiya | H04L 45/22 |
| 9,621,453 | B1* | 4/2017 | Pani | H04L 47/22 |
| 10,103,981 | B2* | 10/2018 | Pignataro | H04L 45/22 |
| 10,917,337 | B1* | 2/2021 | Arora | H04L 45/34 |
| 2003/0110276 | A1* | 6/2003 | Riddle | H04L 41/12 709/230 |
| 2005/0207410 | A1* | 9/2005 | Adhikari | H04L 69/22 370/389 |
| 2007/0157303 | A1* | 7/2007 | Pankratov | H04L 67/14 726/11 |
| 2009/0003223 | A1* | 1/2009 | McCallum | H04L 45/28 370/244 |
| 2009/0225652 | A1 | 9/2009 | Vasseur et al. | |
| 2010/0251329 | A1* | 9/2010 | Wei | H04L 67/1001 726/1 |
| 2011/0013520 | A1* | 1/2011 | Dunn | H04L 41/0659 370/242 |
| 2012/0147805 | A1* | 6/2012 | Kim | H04W 72/20 370/312 |
| 2012/0281526 | A1* | 11/2012 | Singamsetty | H04L 43/10 370/225 |
| 2015/0003255 | A1* | 1/2015 | Frost | H04L 45/24 370/238 |
| 2016/0112328 | A1 | 4/2016 | Anand | |
| 2017/0187603 | A1 | 6/2017 | Kumar et al. | |
| 2017/0230298 | A1 | 8/2017 | Perry et al. | |
| 2017/0366445 | A1* | 12/2017 | Nemirovsky | H04L 45/12 |
| 2018/0026884 | A1* | 1/2018 | Nainar | H04L 41/00 370/392 |
| 2018/0062940 | A1* | 3/2018 | Pignataro | H04L 43/12 |
| 2018/0337825 | A1 | 11/2018 | Kumar et al. | |
| 2018/0337839 | A1* | 11/2018 | Bristow | H04L 43/062 |
| 2020/0007425 | A1* | 1/2020 | Monier | H04L 43/12 |
| 2020/0162337 | A1 | 5/2020 | Jain et al. | |
| 2020/0213212 | A1* | 7/2020 | Dillon | H04L 43/0829 |
| 2021/0281444 | A1 | 9/2021 | Srivatsan et al. | |
| 2021/0352000 | A1* | 11/2021 | Devaraj | H04L 45/38 |
| 2022/0224620 | A1* | 7/2022 | Chhabra | H04L 12/4633 |
| 2022/0224623 | A1* | 7/2022 | Kamath | H04L 12/4641 |
| 2022/0224703 | A1* | 7/2022 | Devarajan | H04L 63/0428 |
| 2022/0224780 | A1* | 7/2022 | Chhabra | H04L 41/0894 |
| 2022/0278917 | A1* | 9/2022 | Voderbet | H04L 43/0829 |
| 2023/0079689 | A1* | 3/2023 | Dunbar | H04L 63/061 726/11 |

OTHER PUBLICATIONS

International Search Report and Written Opinion for International Application No. PCT/US2023/062291, mailed Jun. 22, 2023, 11 Pages.

* cited by examiner

UNDERLAY PATH DISCOVERY FOR A WIDE AREA NETWORK

CROSS-REFERENCE TO RELATED APPLICATION

This application claims priority to U.S. Provisional Patent Application No. 63/311,284, filed Feb. 17, 2022, the content of which is hereby incorporated by reference herein in its entirety.

TECHNICAL FIELD

The subject matter of this disclosure relates in general to the field of computer networking, and more particularly, to systems and techniques for discovery of a tunnel for wide area network.

BACKGROUND

A wide area network (WAN) may extend across multiple network sites (e.g., geographical, logical). In some cases, sites of a WAN are interconnected so that devices at one site can access resources at another site. In some topologies, many services and resources are installed at core sites (e.g., datacenters, headquarters), and many branch sites (e.g., regional offices, retail stores) connect client devices (e.g., laptops, smartphones, internet of things (IoT) devices) to the WAN. These types of topologies may be used by enterprises in establishing their corporate network.

In some examples, each network site has its own local area network (LAN) that is connected to the other LANs of the other sites of the WAN. Networking infrastructure, such as switches and routers, are used to forward network traffic through each of the LANs, through the WAN, and between the WAN and the Internet. Each network site's LAN is connected to the wider network (e.g., to the WAN and/or to the Internet) through a gateway router. Branch gateways (BGs) connect branch sites to the wider network, and virtual internet gateways (VIGs, also known as head-end gateways) connect core sites to the wider network.

In some aspects, WANs can be implemented using a software defined wide area network (SD-WAN) technology. SD-WAN decouples (logically or physically) the control aspects of switching and routing from the physical routing of the network traffic. For example, an SD-WAN may correspond to a virtual overlay network that uses tunnels to carry traffic over multiple underlay networks (e.g., hardware infrastructure).

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE ASPECTS

Figure 1:
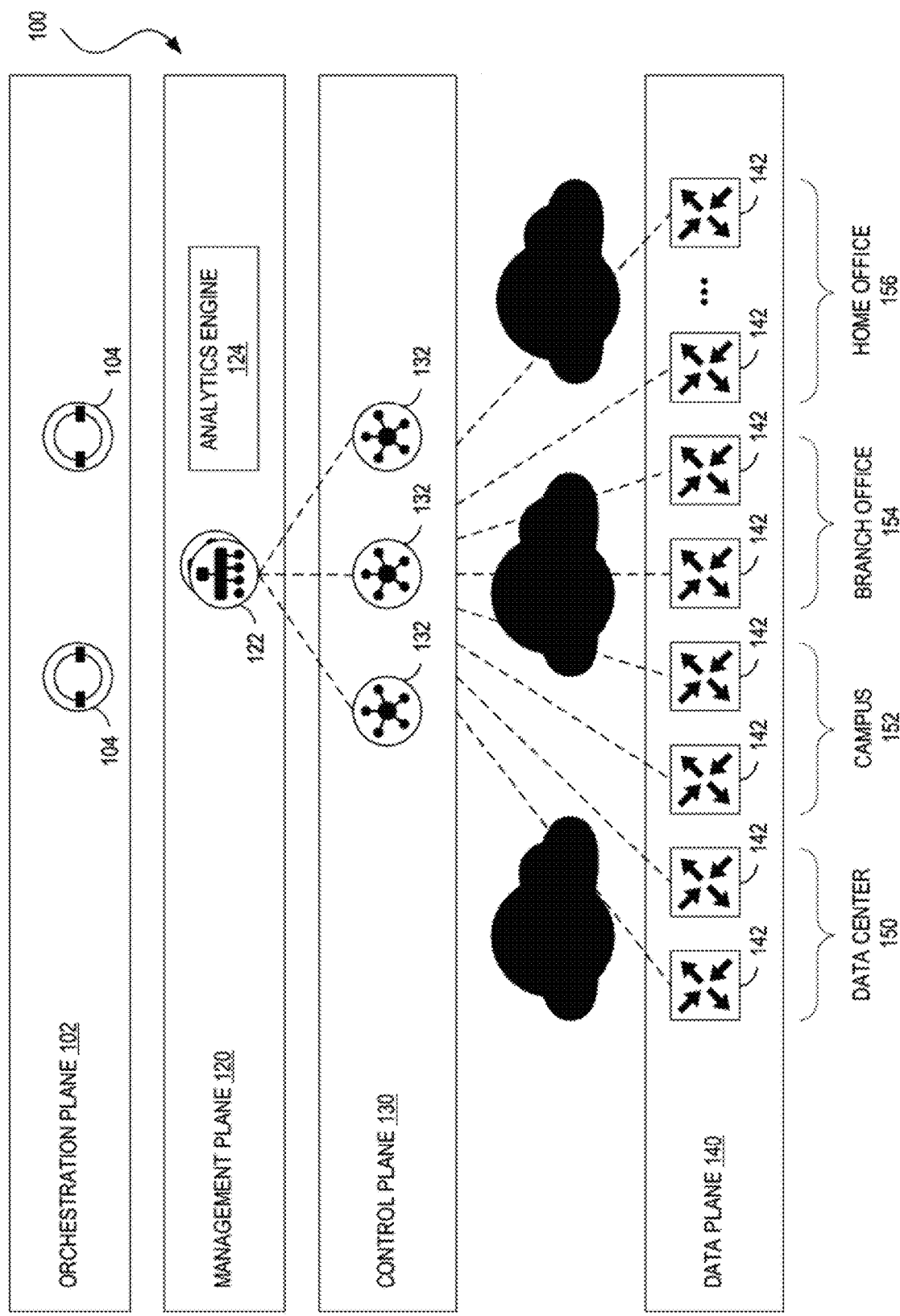
FIG. 1 illustrates an example of a high-level network architecture in accordance with some examples.

The detailed description set forth below is intended as a description of various configurations of aspects and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

The subject matter of this disclosure relates to systems and techniques for discovery of a tunnel for a wide area network. Some aspects provide a method for network path analysis. The method generally includes sending a first probe packet configured to detect one or more network parameters associated with a network tunnel, wherein the first probe packet includes an identifier of the first probe packet and a first time to live (TTL) value that corresponds to a first network hop, receiving a first response message from the first network hop in the network tunnel, wherein the first response message corresponds to the first probe packet and includes the identifier of the first probe packet, and analyzing the network tunnel based on the first response message including the identifier of the first probe packet.

Certain aspects provide an apparatus for network path analysis. The apparatus generally includes at least one memory and at least one processor coupled to the at least one memory. The at least one processor may be configured to send a first probe packet configured to detect one or more network parameters associated with a network tunnel, wherein the first probe packet includes an identifier of the first probe packet and a first TTL value that corresponds to a first network hop, receive a first response message from the first network hop in the network tunnel, wherein the first response message corresponds to the first probe packet and includes the identifier of the first probe packet, and analyze the network tunnel based on the first response message including the identifier of the first probe packet.

Certain aspects provide a non-transitory computer-readable medium having instructions stored thereon, which when executed by at least one processor, cause the at least one processor to send a first probe packet configured to detect one or more network parameters associated with a network tunnel, wherein the first probe packet includes an identifier of the first probe packet and a first TTL value that corresponds to a first network hop, receive a first response message from the first network hop in the network tunnel, wherein the first response message corresponds to the first probe packet and includes the identifier of the first probe packet, and analyze the network tunnel based on the first response message including the identifier of the first probe packet.

Example Aspects

Certain aspects of the present disclosure provide systems and techniques for network path analysis. Due to various challenges, it may be difficult to determine an exact path of a packet sent through a tunnel between network endpoints. Some aspects of the present disclosure provide techniques for identifying a path associated with a tunnel between the network endpoints, and in some aspects, identifying network parameters (e.g., latency or jitter) associated with the network. For example, probes may be sent through the tunnel, each probe having an associated probe identifier. Each probe may also include a time to live (TTL) value that is decremented at each hop (e.g., at each intermediate node between the endpoints) through the network. Once the TTL value reaches 0, a message is sent back by the corresponding intermediate node. The message may indicate the identifier of the probe that included the TTL and an identifier of the tunnel. Multiple probes may be sent, each having a TTL that is incremented by 1, such that the intermediate node of each hop on the tunnel sends back a response with respective probe and tunnel identifiers that can be used to identify the path associated with the tunnel, and in some cases, network parameters such as latency and jitter associated with the tunnel.

FIG. 1 illustrates an example of a network architecture 100 for implementing aspects of the present technology. An example of an implementation of the network architecture 100 is the Cisco® SDWAN architecture. However, one of ordinary skill in the art will understand that, for the network architecture 100 and any other system discussed in the present disclosure, there can be additional or fewer components in similar or alternative configurations. The illustrations and examples provided in the present disclosure are for conciseness and clarity. Other aspects may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some aspects, the network orchestrator appliance(s) 104 can also enable communication of devices located behind Network Address Translation (NAT). In some aspects, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some aspects, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively, or in addition, the network management appliance(s) 122 can be a dedicated network management system for a single entity. In some aspects, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each edge network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some aspects, the network controller appliance(s) 132 can operate as route reflectors. The network controller appliance(s) 132 can also orchestrate secure connectivity in the data plane 140 between and among the edge network devices 142. For example, in some aspects, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some aspects, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some aspects, physical or virtual Cisco® SD-WAN vEdge routers can operate as the edge network devices 142.

Figure 2:
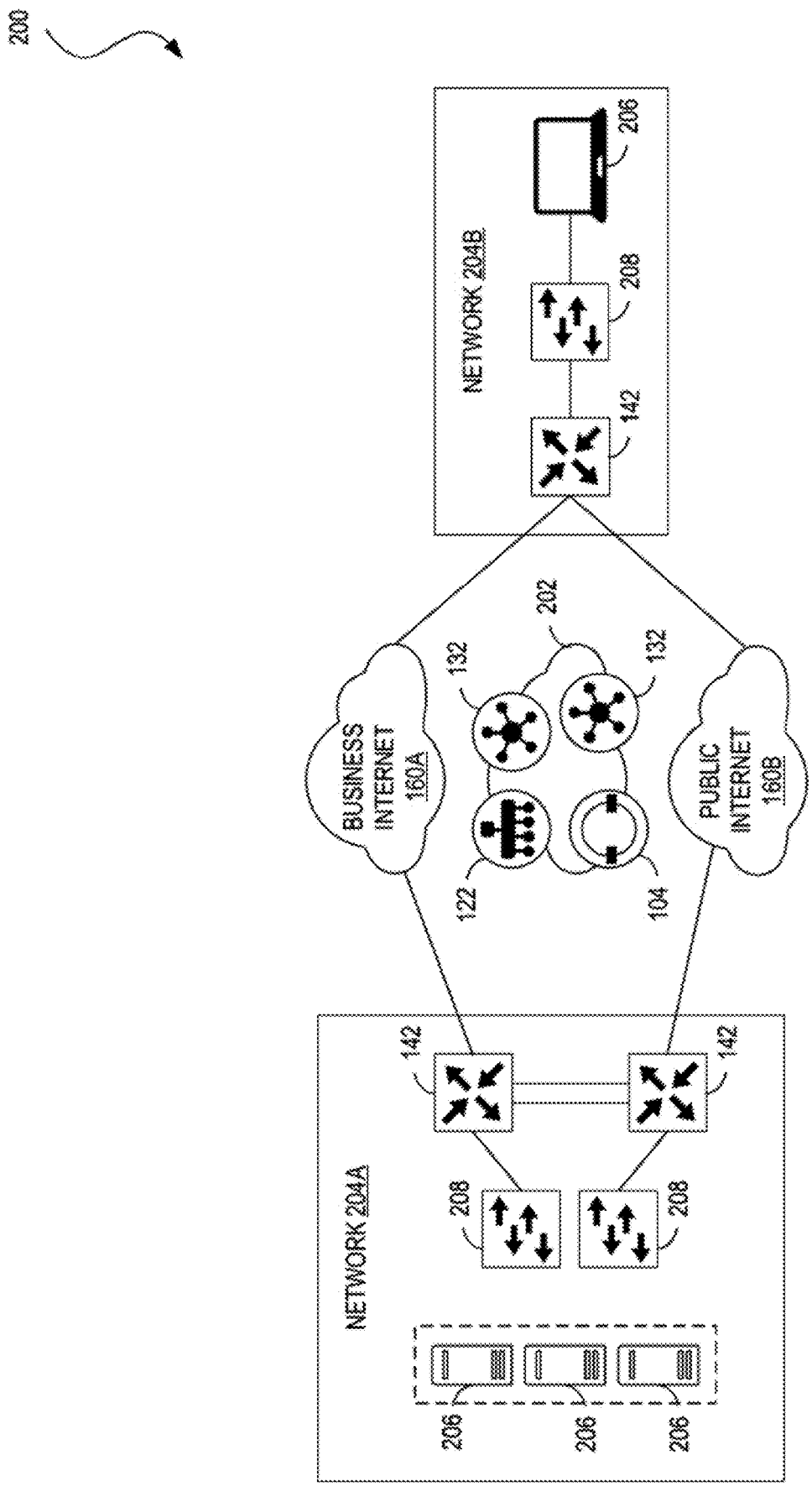
FIG. 2 illustrates an example of a network topology in accordance with some examples.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some aspects, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some aspects, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some aspects, each edge network device 208 can form a Datagram Transport Layer Security (DTLS) or TLS control connection to the network controller appliance(s) 132 and connect to any network control appliance 132 over each transport network 160. In some aspects, the edge network devices 142 can also securely connect to edge network devices in other sites via IPSec tunnels. In some aspects, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
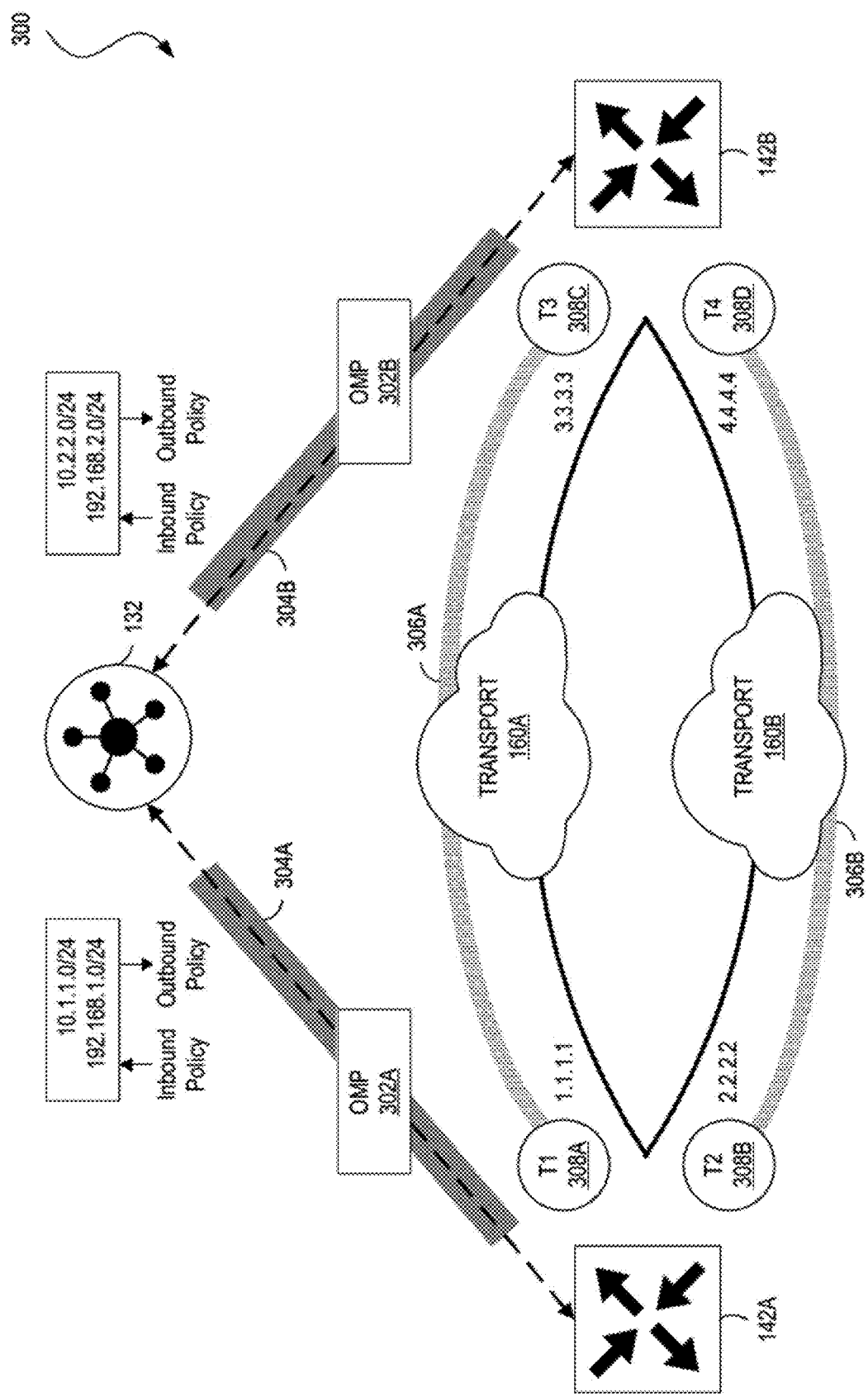
FIG. 3 illustrates an example of a diagram showing the operation of a protocol for managing an overlay network in accordance with some examples.

FIG. 3 illustrates an example of a diagram 300 showing the operation of an Overlay Management Protocol (OMP), which may be used in some aspects to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

The OMP may advertise three types of routes. One type of route includes OMP routes, which can correspond to prefixes learned from the local site, or service side, of the edge network device 142. The prefixes can be originated as static or connected routes, or from within, for example, the OSPF or BGP protocols, and redistributed into OMP so they can be carried across the overlay. OMP routes may advertise attributes such as transport location (TLOC) information (e.g., which may be similar to a BGP next-hop IP address) and other attributes such as origin, originator, preference, site identifier, tag, and virtual private network (VPN). An OMP route may be installed in a forwarding table if the TLOC it points to is active.

Another type of route is TLOC routes, which can correspond to logical tunnel termination points on the edge network devices 142 that connect into the transport networks 160. In some aspects, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some aspects, a TLOC may be in an active state on a particular edge network device 142 when an active BFD session is associated with that TLOC.

Another type of route includes service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
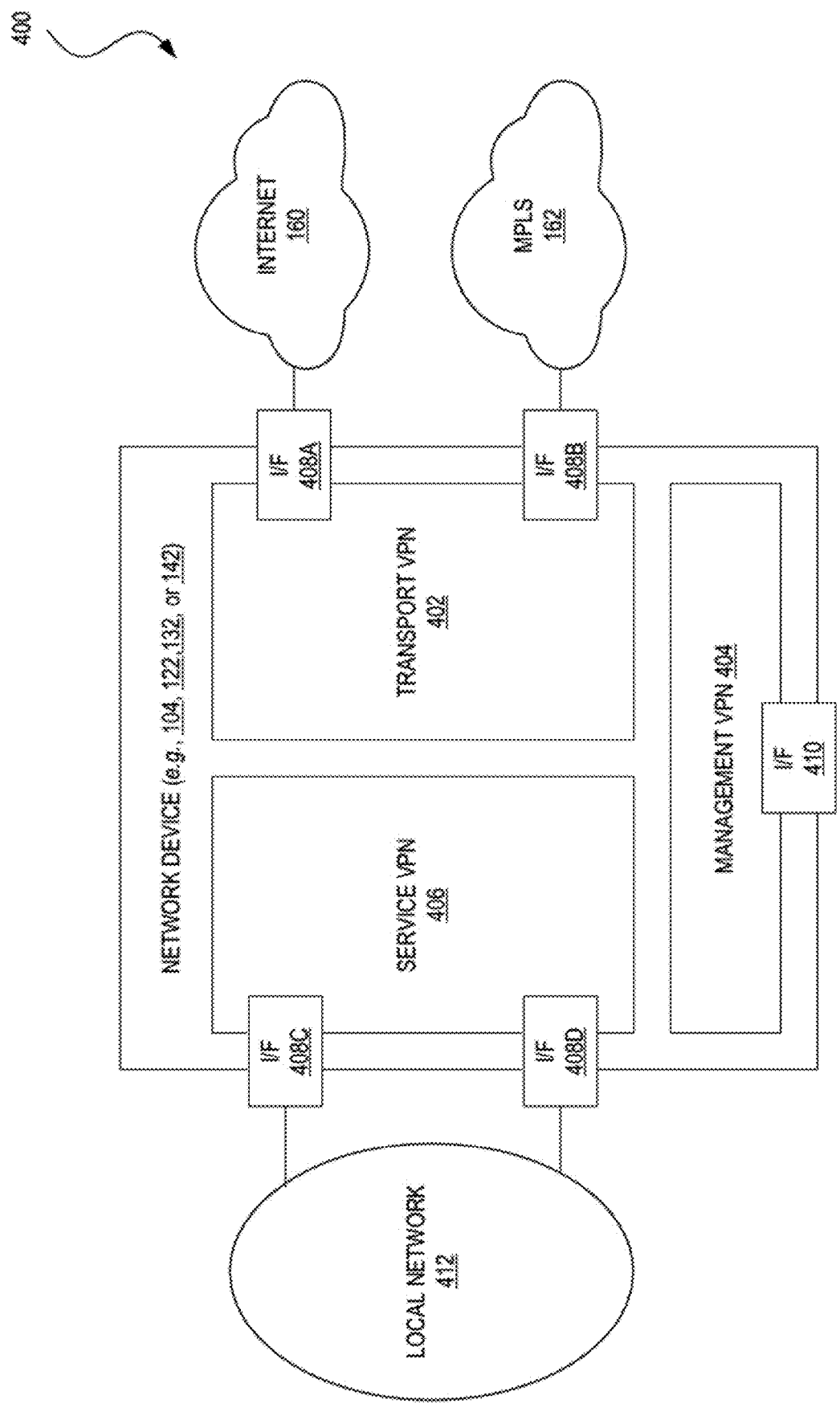
FIG. 4 illustrates an example of a diagram showing the operation of virtual private networks for segmenting a network in accordance with some examples.

FIG. 4 illustrates an example of a diagram 400 showing the operation of VPNs, which may be used in some aspects to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some aspects, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some aspects, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some aspects, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, network interfaces 410) are shown to be physical interfaces in this example, one of ordinary skill in the art will appreciate that the interfaces 410 in the transport and service VPNs can also be sub-interfaces instead.

Figure 5:
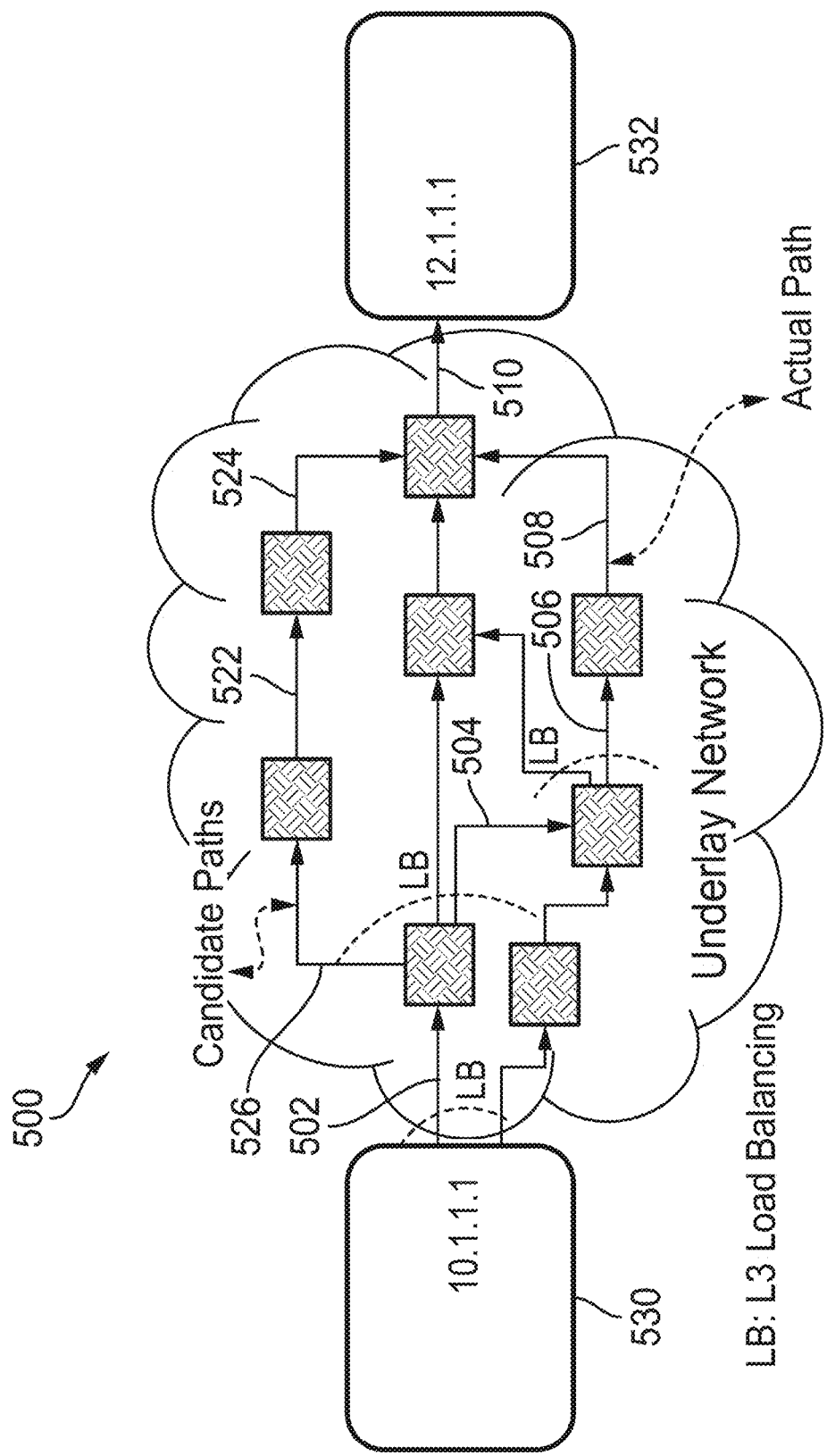
FIG. 5 illustrates an example of a network architecture in accordance with some examples.

FIG. 5 illustrates an example of a network architecture 500 (e.g., a software-defined wide area network (SD-WAN)), in accordance with some aspects of the present technology. As used herein, an underlay network (e.g., an underlay path) generally refers to a physical infrastructure above which an overlay network (e.g., overlay path) is built. The underlay path is the underlying network responsible for the delivery of packets across networks (e.g., between endpoints). An overlay network (e.g, overlay path) is a virtual network that is built on top of underlying network infrastructure (underlay network).

In some aspects, network architecture 500 can include a fabric of tunnels over an underlay IP network formed by IP routing protocols like a border gateway protocol (BGP), open shortest path first (OSPF), or intermediate system to intermediate system (ISIS). In some cases, tunnel endpoints 530, 532 can correspond to internet protocol (IP) addresses within the underlay network. For example, tunnel endpoint 530 may correspond to one IP 10.1.1.1 and tunnel endpoint 532 may correspond to another IP 12.1.1.1. Endpoint 530 may be a SDWAN edge node and endpoint 532 may be another SDWAN edge node, in some implementations.

There are many underlay network paths between tunnel endpoints. However, at any point in time, there is one underlay path that corresponds to the overlay tunnel. Thus, there are two types of underlay paths, a candidate path (CP) (e.g., one of many paths between endpoints which might be unused) and an actual path (e.g., a single path used by the overlay at a particular time). For example, internode paths 502, 504, 506, 508, 510 may be used for routing a packet between endpoints 530, 532 and may be referred to as the actual path forming a tunnel between tunnel endpoints 530, 532. Other paths may be candidate paths. One example candidate path (e.g., for routing a packet between endpoints 530, 532) between tunnel endpoints 530, 532 which may be unused may include internode paths 502, 526, 522, 524, 510.

Candidate paths may be discovered by various path-discovery methods. In some cases, SDWAN underlay discovery (e.g., measurement and/or tracing) of the actual path may not be performed using existing practices due to tracing and measurement challenges. For instance, tracing challenges associated with the actual underlay path may include IP packet addresses (e.g., chosen source address and destination address influencing routing) being inconsistent with the overlay outer IP. Another tracing challenge may involve TCP/UDP port numbers being inconsistent with the overlay outer IP. Other challenges may include layer 3 (L3) load-balancing (e.g., may lead to tracing an underlay path that is not exact), transmission control protocol (TCP)/user datagram protocol (UDP) port numbers that cannot be used to keep track of hop ordering, access control in remote and local SDWAN edges, and/or NAT in remote and local SDWAN edges. In some cases, measurement challenges associated with the actual underlay path may include inconsistent shaping, queueing, and differentiated services in the network (e.g., especially at the WAN edges), and fragmentation in the underlay. Certain aspects of the present disclosure provide systems and techniques to perform path discovery (e.g., measurement and/or tracing) of the actual underlay path corresponding to a network tunnel (e.g., an SD-WAN overlay tunnel), as described in more detail with respect to FIG. 6.

Figure 6:
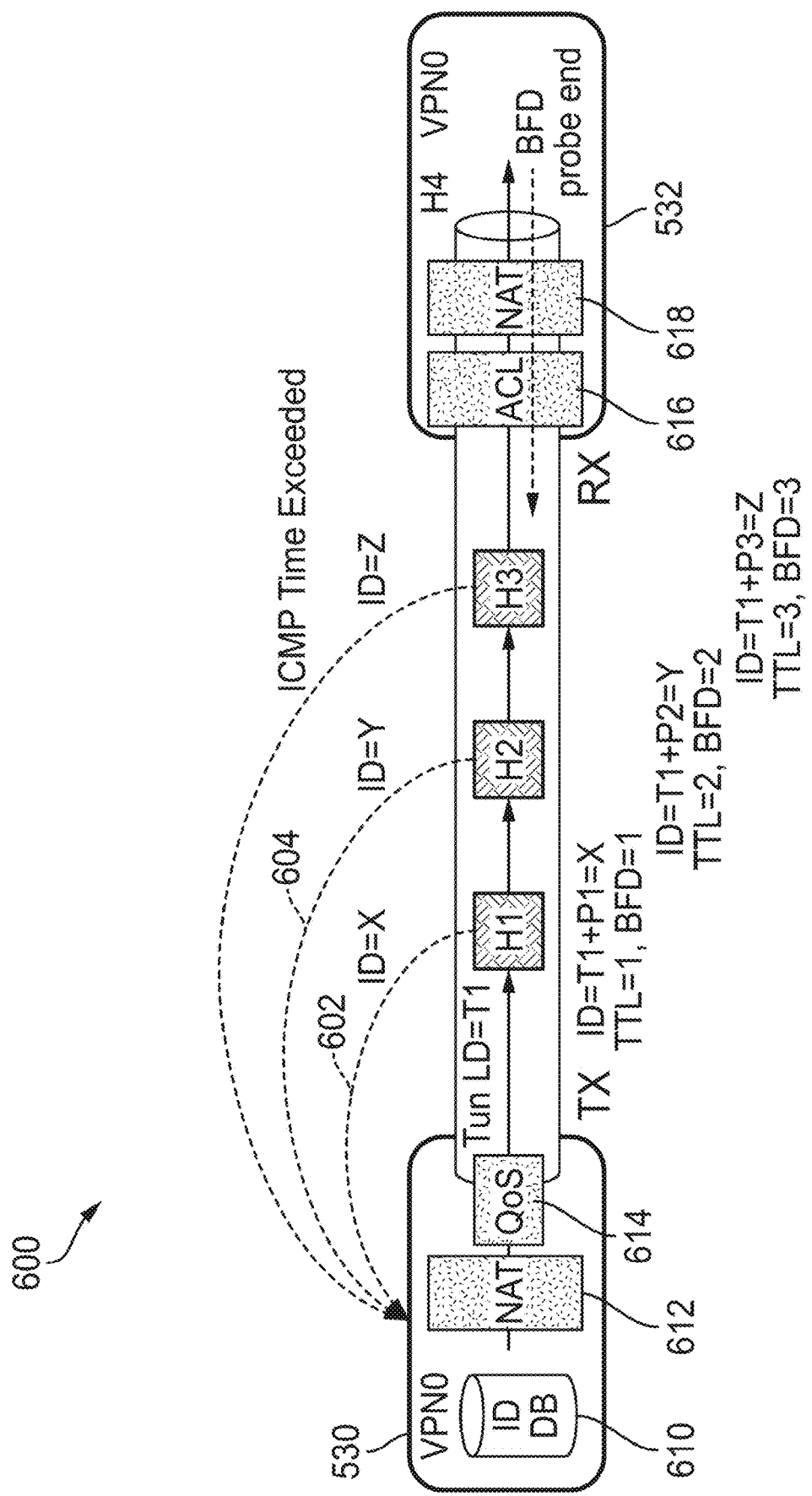
FIG. 6 illustrates an example of a network tunnel in accordance with some examples.

FIG. 6 illustrates an example of a network architecture 600 (e.g., SD-WAN), in accordance with some aspects of the present technology. As shown, the network architecture 600 includes an endpoint 530 and an endpoint 532 and a network tunnel between the endpoints. The network tunnel shown in FIG. 6 may correspond to the actual path described with respect to FIG. 5. The network tunnel includes multiple intermediate nodes between the endpoints, each intermediate node being associated with a hop through the tunnel (e.g., labeled H1, H2, H3, and so on). As shown, the endpoint 530 may include an ID database 610 which may be used to store and track various identifiers associated with probes or tunnels described herein. Each of the endpoints 530, 532 may include a NAT component 612, 618, respectively. NAT is a process that enables one IP address to represent a group of computers. The endpoint 530 may also include a quality of service (QoS) component 614. QoS refers to a mechanism that works on a network to control traffic and ensure the performance of important applications with limited network capacity. The endpoint 532 may include a network access control list (ACL) component 616. A network ACL is a layer of security that controls traffic.

In some aspects, network architecture 600 can include an overlay tunnel (e.g., having a tunnel local discriminator (LD) of T1, also referred to herein as a tunnel identifier) that may correspond to an underlay path having multiple hops (e.g., labeled H1, H2, and H3 in FIG. 6). In some examples, tracing and measurement of the underlay path (e.g., the exact actual path) may be performed using a trace that can follow the tunnel path. The tunnel path may be followed by sending probe packets through the tunnel instead of the underlay. In some examples, a probe packet sent using the tunnel may be configured such that a destination or remote end does not drop the packet as it bypasses WAN access controls.

In some aspects, a modified BFD packet can be used as the probe packet. In other aspects, different customized probe packets may be used. In some examples, probe packets may be sent periodically (e.g., to generate continuous low-frequency data points for time-series based analytics), on-demand (e.g., spot debugging), or may be event-driven (e.g., events such as a tunnel's SLA changes, loss increases above a threshold, path maximum transmission unit (PMTU) changes).

In some examples, detecting each underlay hop of the tunnel may involve assigning a monotonic ID to each probe (e.g., starting at BFD of 1 in FIG. 6). Each probe may be assigned an identifier P (e.g., P1, P2, to Pn, n being a positive integer representing the number of probes). In some aspects, the monotonic ID can be copied to a time to live (TTL) field of the outer tunnel header during L3 encapsulation of the probe. For instance, an initial probe packet may be configured with and include a probe identifier of 1 (e.g., same as the value of a TTL for the probe). The TTL and probe identifier can be increased (e.g., incremented by 1) for each of the subsequent probe packets associated with each subsequent hop.

In some aspects, at each hop, the TTL can be decremented until the TTL reaches a value of 0. Once the TTL reaches 0, an interne control message protocol (ICMP) time exceeded message (e.g., message 602 or message 604) may be generated at the intermediate node (e.g., node for H1 or node for H2) associated with the hop at which TTL reaches 0 and forwarded back to the sender (e.g., endpoint 530) on the underlay tunnel. For example, if TTL is initially set to 1 and H1 is the first hop, then TTL will reach a value of 0 at the node associated with H1. The node at H1 may then send a message 602 with ID having a value X back to the endpoint 530. In some aspects, the value X of the ID in message 602 may indicate an identifier of the tunnel T1 and an identifier of the first probe P1. A second probe sent by the endpoint 530 may include a probe identifier P2, TTL of 2, and a tunnel identifier of T1 (e.g., same as tunnel identifier of probe P1 since both the first and second probes are sent for the same tunnel). In this case, since the TTL of the second probe is set to 2, the TTL is decremented at each hop and reaches a value of 0 at the node associated with H2, as shown. The second hop then sends back a message 604 having an ID of Y indicating T1 and P2 (e.g., a concatenation of bits indicating T1 and P2). The same process is performed until a final probe is sent that reaches the endpoint 532. Based on each of the response messages for each hop, the endpoint 530 may determine the actual path (e.g., exact path) associated with the tunnel (T1) and various parameters such as latency and jitter associated with the tunnel.

Each tunnel may be assigned a descriptor, which is the BFD LD (e.g., T1) in the example tunnel provided in FIG. 6. As described, each probe may be identified using an identifier P. For example, the first probe sent by the endpoint 530 may include identifier P1, the second probe sent by the endpoint 530 may include identifier P2, and so on. Therefore, the ID included in each message (e.g., message 602) may include the identifier of the tunnel (T1) and the identifier of the probe (e.g., P1 for the first probe). For example, a subset of bits making up the ID may indicate T1 and another subset of bits making up the ID may indicate P1. As described, there may be multiple tunnels between endpoints (e.g., corresponding to an actual path and candidate paths, as described with respect to FIG. 5). The response from each hop may be uniquely mapped to a particular tunnel using the tunnel identifier in order to identify the actual path. In some aspects, the identifier P of each probe may be equal to the TTL which is also incremented for each probe sent, as described. Each hop indicating the ID (including the tunnel and probe identifiers) allows the endpoint 530 to determine the actual path taken by the probes.

As described herein, the probes may be used to identify each hop and/or to measure parameters that may include latency and/or jitter. For example, endpoint 530 may determine latency from the endpoint to a particular hop based on an amount of time from when the probe was sent to when the probe was received at the hop. In some implementations, the probe may include a time stamp for determining one way latency (e.g., from the endpoint 530 to a particular hop). In some cases, latency may be determined for multiple hops (e.g., H1 and H2). A latency between the hops may be determined as the difference between the latencies for the hops. For instance, the latency associated with H2 minus the latency associated with H1 may indicate the latency for routing a packet between H1 and H2.

In some configurations, the present technology will not cause an ICMP port unreachable packet to be generated by the destination. In some cases, the end of path may be established when the SDWAN remote edge responds to the received BFD probe by sending a BFD probe end response back through the tunnel (e.g., can improve the reliability of finding the end of the tunnel).

In some aspects, each probe packet may include one or more parameters or data fields. For example, a probe packet may include a unique monotonic number which can be used to identify the original probe and to establish the ordering of hops within a tunnel. Each probe may also include one per-tunnel magic which can be used to identify the tunnel as each WAN interface may terminate multiple tunnels. In some aspects, the per-tunnel magic may correspond to the BFD LD of the probe, as described herein. Each probe may also include one global magic which may be used to bypass WAN access control and network address translation (NAT).

In some aspects, the fields in a probe packet may be separate or concatenated. In one illustrative example, fields may be concatenated into a 16-bit value and the value may be copied into the 16-bit ID field of an outer IP header. In some cases, the parameters or fields associated with a probe packet may be sent as an IP option. In some examples, the outer IP header may be received as an unencrypted payload of the returning ICMP time exceeded message from each hop. In some cases, an inspection of the returned IP identification field allows the originating SD-WAN edge to associate the ICMP response to a specific tunnel and establish the ordering of hops, as described herein. The packet may bypass NAT and WAN access controls, in some implementations.

In some aspects, internet protocol security (IPSEC) encryption to the endpoint can be used to provide extended security for the probe. Tunnel encapsulation can be used to pass through provider NATs on the underlay. In some cases, elements (e.g., source and destination IP addresses and ports) from ICMP time exceeded packet can be used at the originator to authenticate the message (e.g., using NAT table lookup).

Figure 7:
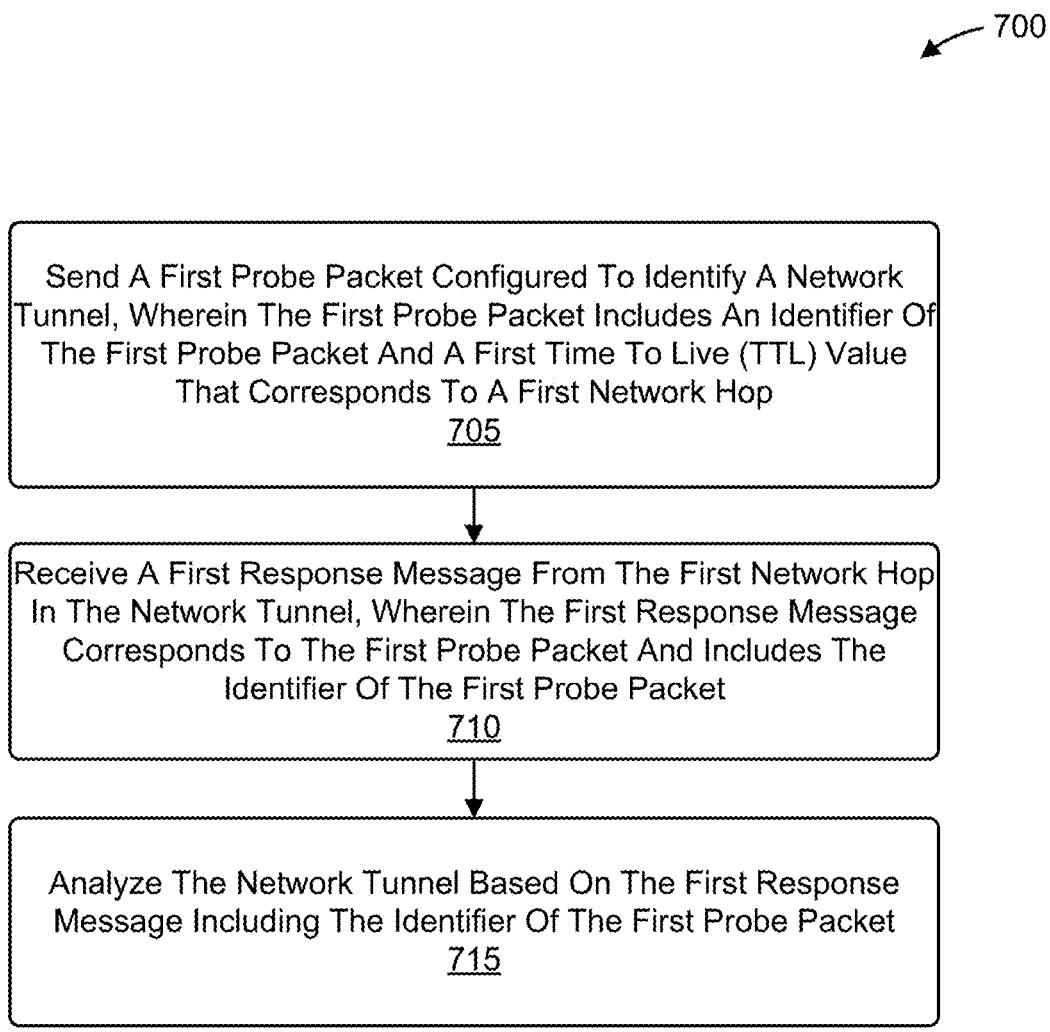
FIG. 7 is a flow diagram illustrating example operations for network path analysis in accordance with some examples.

FIG. 7 is a flow diagram illustrating example operations 700 for network path analysis, in accordance with certain aspects of the present disclosure. The operations 700 may be performed by a computing system (e.g., endpoint 530, network device 800, or computing system 900).

At block 705, the computing system sends a first probe packet configured to identify a network tunnel. The first probe packet may be sent through the network tunnel. The first probe packet may include an identifier (e.g., P1 described with respect to FIG. 6) of the first probe packet and a first TTL value that corresponds to a first network hop. The first probe packet may correspond to a BFD packet.

At block 710, the computing system receives a first response message from the first network hop in the network tunnel. The first response message may correspond to the first probe packet and include the identifier of the first probe packet. The first response message may correspond to a ICMP time exceeded message.

At block 715, the computing system analyzes the network tunnel based on the first response message including the identifier of the first probe packet. For example, analyzing the network tunnel may include determining one or more network parameters associated with the first network hop. The one or more network parameters may include at least one of a latency parameter and a jitter parameter. In some aspects, the first probe packet may also include an identifier (e.g., T1 described with respect to FIG. 6) of the network tunnel. The first response message may include the identifier of the network tunnel.

In some aspects, the computing system may also send a second probe packet including an identifier (e.g., P2 described with respect to FIG. 6) of the second probe packet and a second TTL value that corresponds to a second network hop. The computing system may receive a second response message from the second network hop in the network tunnel, wherein the second response message corresponds to the first probe packet and includes the identifier of the first probe packet. The computing system may identify a path associated with the network tunnel based on the identifier of the first probe packet in the first response message and the identifier of the second probe packet in the second response message. In some cases, the computing system may determine a first latency associated with the first network hop based on the first response message, and determine a second latency associated with the second network hop based on the second response message. The computing system may also determine a latency between first network hop and the second network hop based on a difference between the first latency and the second latency.

Figure 8:
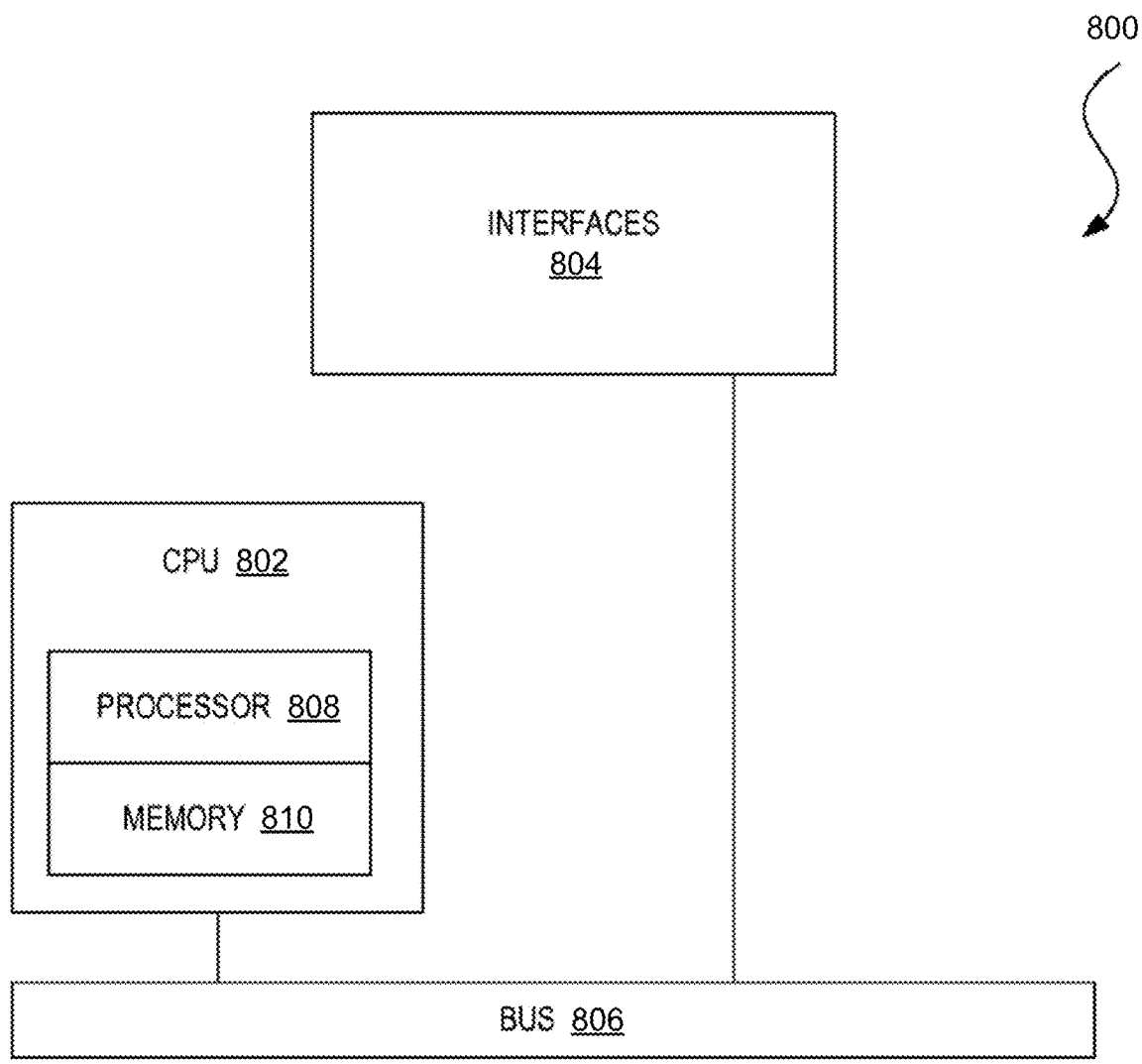
FIG. 8 illustrates an example of a network device in accordance with some examples.

FIG. 8 illustrates an example of a network device 800 (e.g., switch, router, network appliance, etc.). The network device 800 can include a master central processing unit (CPU) 802, interfaces 804, and a bus 806 (e.g., a PCI bus). When acting under the control of appropriate software or firmware, the CPU 802 can be responsible for executing packet management, error detection, and/or routing functions. The CPU 802 preferably accomplishes all these functions under the control of software including an operating system and any appropriate applications software. The CPU 802 may include one or more processors 808 such as a processor from the Motorola family of microprocessors or the MIPS family of microprocessors. In an alternative aspect, the processor 808 can be specially designed hardware for controlling the operations of the network device 800. In an aspect, a memory 810 (such as non-volatile RAM and/or ROM) can also form part of the CPU 802. However, there are many different ways in which memory could be coupled to the system.

The interfaces 804 can be provided as interface cards (sometimes referred to as line cards). The interfaces 804 can control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 804 may include ports appropriate for communication with the appropriate media. In some cases, the interfaces 804 may also include an independent processor and, in some instances, volatile RAM. The independent processors may control communication intensive tasks such as packet switching, media control, and management. By providing separate processors for the communication intensive tasks, the interfaces 804 may allow the CPU 802 to efficiently perform routing computations, network diagnostics, security functions, and so forth.

Although the system shown in FIG. 8 is an example of a network device of an aspect, it is by no means the only network device architecture on which the subject technology can be implemented. For example, an architecture having a single processor that can handle communications as well as routing computations and other network functions, can also be used. Further, other types of interfaces and media may also be used with the network device 800.

Regardless of the network device's configuration, it may employ one or more memories or memory modules (including the memory 810) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 9:
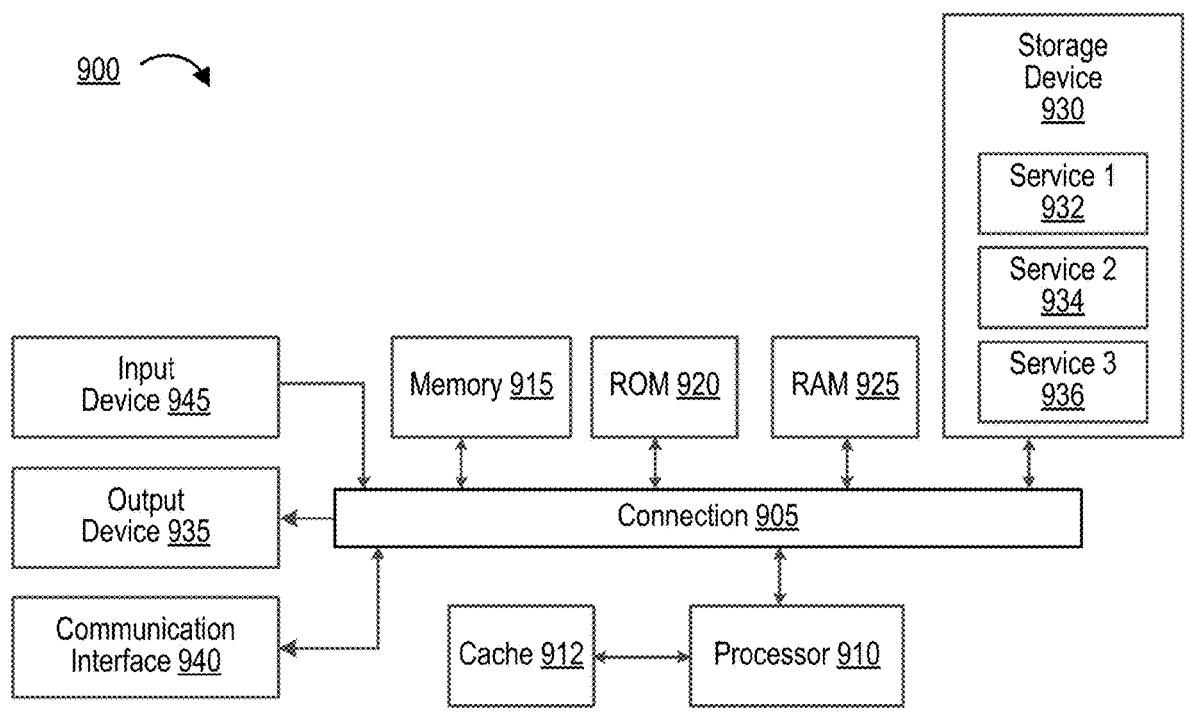
FIG. 9 illustrates an example computing device in accordance with some examples.

FIG. 9 illustrates an example of a bus computing system 900 wherein the components of the system are in electrical communication with each other using a bus 905. The computing system 900 can include a processing unit (CPU or processor) 910 and a system bus 905 that may couple various system components including the system memory 915, such as read only memory (ROM) 920 and random access memory (RAM) 925, to the processor 910. The computing system 900 can include a cache 912 of high-speed memory connected directly with, in close proximity to, or integrated as part of the processor 910. The computing system 900 can copy data from the memory 915, ROM 920, RAM 925, and/or storage device 930 to the cache 912 for quick access by the processor 910. In this way, the cache 912 can provide a performance boost that avoids processor delays while waiting for data. These and other modules can control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in the storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing system 900, an input device 945 can represent any number of input mechanisms, such as a microphone for speech, a touch-protected screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing system 900. The communications interface 940 can govern and manage the user input and system output. There may be no restriction on operating on any particular hardware arrangement and therefore the basic features here may easily be substituted for improved hardware or firmware arrangements as they are developed.

The storage device 930 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 930 can include the software modules 932, 934, 936 for controlling the processor 910. Other hardware or software modules are contemplated. The storage device 930 can be connected to the system bus 905. In some aspects, a hardware module that performs a particular function can include a software component stored in a computer-readable medium in connection with the necessary hardware components, such as the processor 910, bus 905, output device 935, and so forth, to carry out the function.

For clarity of explanation, in some instances the various aspects may be presented as including individual functional blocks including functional blocks comprising devices, device components, steps or routines in a method embodied in software, or combinations of hardware and software.

In some aspects the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method for network path analysis, comprising:
    sending a first probe packet configured to identify a first underlay hop of a plurality of underlay hops of an overlay network tunnel, wherein the first probe packet includes (i) an identifier, the identifier including identification of the overlay network tunnel and identification of the first probe packet, and (ii) a first time to live (TTL) value that corresponds to the first underlay network hop, and wherein the first probe packet is sent through the overlay network tunnel, wherein the overlay network tunnel comprises a software defined wide area network (SD-WAN) tunnel;
    receiving a first response message from the first network hop in the overlay network tunnel, wherein the first response message corresponds to the first probe packet and includes the identifier;
    sending additional probe packets to identify the plurality of underlay hops of the overlay tunnel, wherein each of the additional probe packets includes (i) an identifier, the identifier including identification of the overlay network tunnel and identification of the respective additional probe packet, and (ii) a respective TTL value that corresponds to a respective network hop, wherein the TTL value is decremented at each hop until it equals zero;
    receiving respective response messages from the respective network hops in the overlay network tunnel, wherein the respective response messages correspond to the respective additional probe packets and includes the respective identifiers;
    identifying an actual network path by mapping the tunnel identifiers from the respective response messages; and
    analyzing the overlay network tunnel based on the respective response messages to determine one or more network parameters associated with the respective network hops.

2. The method of claim 1, wherein the identifier of the first probe packet and the identifier of the additional probe packets comprise monotonically increasing values.

3. The method of claim 1, further comprising:
    determining a first latency associated with the first underlay network hop based on the first response message; and
    determining a additional latency associated with one or more of the plurality of additional underlay network hops based on the respective response message.

4. The method of claim 3, further comprising determining a latency between first underlay network hop and one of the plurality of additional network hops based on a difference between the first latency and the additional latency.

5. The method of claim 1, wherein the respective TTL values are greater than the first TTL value by 1.

6. The method of claim 1, wherein the first probe packet corresponds to a bidirectional forwarding detection (BFD) packet.

7. The method of claim 1, wherein the first response message corresponds to an Internet Control Message Protocol (ICMP) time exceeded message.

8. The method of claim 1, wherein analyzing the overlay network tunnel comprises determining one or more network parameters associated with the first underlay network hop.

9. The method of claim 8, wherein the one or more network parameters include at least one of a latency parameter or a jitter parameter.

10. The method of claim 1, wherein the first response message includes an identifier of the overlay network tunnel.

11. The method of claim 1, wherein the overlay network tunnel comprises an underlay tunnel.

12. The method of claim 1, wherein the first probe packet comprises an indicator to bypass at least one of wide area network (WAN) access control or network address translation (NAT).

13. The method of claim 1, wherein the identifier of the first probe packet corresponds to the first TTL value.

14. An apparatus for network path analysis, comprising:
    at least one memory; and
    at least one processor coupled to the at least one memory, the at least one processor being configured to:
        send a first probe packet configured to identify an underlay hop of a plurality of underlay hops of an overlay network tunnel, wherein the first probe packet includes (i) an identifier, the identifier including identification of the overlay network tunnel and identification of the first probe packet, and (ii) a first time to live (TTL) value that corresponds to a first network hop, and wherein the first probe packet is sent through the overlay network tunnel, wherein the overlay network tunnel comprises a software defined wide area network (SD-WAN) tunnel;
        receive a first response message from the first network hop in the overlay network tunnel, wherein the first response message corresponds to the first probe packet and includes the identifier; and
        send additional probe packets to identify the plurality of underlay hops of the overlay tunnel, wherein each of the additional probe packets includes (i) an identifier, the identifier including identification of the overlay network tunnel and identification of the respective additional probe packet, and (ii) a respective TTL value that corresponds to a respective network hop, wherein the TTL value is decremented at each hop until it equals zero;
        receive respective response messages from the respective network hops in the overlay network tunnel, wherein the respective response messages correspond to the respective additional probe packets and includes the respective identifiers;

identify an actual network path by mapping the tunnel identifiers from the respective response messages;

analyze the overlay network tunnel based on the respective response messages to determine one or more network parameters associated with the respective network hops.

15. The apparatus of claim 14, wherein the at least one processor is further configured to:

determine a first latency associated with the first underlay network hop based on the first response message; and determine a second latency associated with one of the additional network hop based on the respective additional response messages.

16. The apparatus of claim 15, wherein the at least one processor is further configured to determine a latency between first network hop and one of the additional network hops based on a difference between the first latency and the second latency.

17. A non-transitory computer-readable medium having instructions stored thereon, which when executed by at least one processor, cause the at least one processor to:

send a first probe packet configured to identify an underlay hop of a plurality of underlay hops of an overlay network tunnel, wherein the first probe packet includes (i) an identifier, the identifier including identification of the overlay network tunnel and identification of the first probe packet, and (ii) a first time to live (TTL) value that corresponds to a first network hop, and wherein the first probe packet is sent through the overlay network tunnel;

receive a first response message from the first network hop in the overlay network tunnel, wherein the first response message corresponds to the first probe packet and includes the identifier; and send additional probe packets to identify the plurality of underlay hops of the overlay tunnel, wherein each of the additional probe packets includes (i) an identifier, the identifier including identification of the overlay network tunnel and identification of the respective additional probe packet, and (ii) a respective TTL value that corresponds to a respective network hop, wherein the TTL value is decremented at each hop until it equals zero;

receive respective response messages from the respective network hops in the overlay network tunnel, wherein the respective response messages correspond to the respective additional probe packets and includes the respective identifiers;

identify an actual network path by mapping the tunnel identifiers from the respective response messages;

analyze the overlay network tunnel based on the respective response messages to determine one or more network parameters associated with the respective network hops.

18. The apparatus of claim 14, wherein the first probe packet corresponds to a bidirectional forwarding detection (BFD) packet.

19. The apparatus of claim 14, wherein the first response message corresponds to an Internet Control Message Protocol (ICMP) time exceeded message.

20. The apparatus of claim 14, wherein the first probe packet comprises an indicator to bypass at least one of wide area network (WAN) access control or network address translation (NAT).

* * * * *